United States Patent [19]

Forsythe

[11] Patent Number: 5,564,520
[45] Date of Patent: Oct. 15, 1996

[54] PNEUMATIC SEAT ROLLOVER VENT VALVE

[75] Inventor: Alan K. Forsythe, Vashon, Wash.

[73] Assignee: GT Development Corporation, Tukwila, Wash.

[21] Appl. No.: 262,593

[22] Filed: Jun. 20, 1994

[51] Int. Cl.⁶ .................... B60R 21/13; B60N 2/16; B60N 2/52; F16K 17/36
[52] U.S. Cl. .................. 180/282; 137/38; 248/631; 267/131; 296/68.1; 297/216.1
[58] Field of Search .................. 180/282; 137/38, 137/43, 45; 248/631; 297/216.1, DIG. 8; 267/131; 296/68.1

[56] References Cited

U.S. PATENT DOCUMENTS

| | | | |
|---|---|---|---|
| 406,290 | 7/1889 | Murdock | 137/38 |
| 2,239,098 | 4/1941 | Hunter | 137/38 |
| 2,461,304 | 2/1949 | Wilson | 137/38 |
| 3,106,203 | 10/1963 | Mayo et al. | 137/38 |
| 3,298,654 | 1/1967 | Dome | 248/631 |
| 3,389,715 | 6/1968 | Hebard et al. | 137/43 |
| 3,994,360 | 11/1976 | Leibold | 180/282 |
| 4,392,507 | 7/1983 | Harris | 137/38 |
| 4,514,010 | 4/1985 | Sabater Gonzalez | 297/284.1 |
| 4,565,208 | 1/1986 | Ritchie et al. | 137/38 |
| 4,878,511 | 11/1989 | Fox | 137/38 |
| 4,938,528 | 7/1990 | Scott | 297/284.6 |
| 4,966,410 | 10/1990 | Bishai | 297/284.1 |
| 5,005,904 | 4/1991 | Clemens et al. | 297/284.6 |
| 5,234,203 | 8/1993 | Smith | 248/631 |
| 5,242,072 | 9/1993 | Koebernik | 137/43 |
| 5,492,368 | 2/1996 | Pywell et al. | 180/282 |

FOREIGN PATENT DOCUMENTS

| | | | |
|---|---|---|---|
| 893280 | 4/1962 | United Kingdom | 137/43 |

*Primary Examiner*—Kevin Hurley
*Assistant Examiner*—Peter C. English
*Attorney, Agent, or Firm*—Christensen, O'Connor, Johnson & Kindness PLLC

[57] ABSTRACT

An orientation-sensitive pressure release for the airbag (15) of a vehicular pneumatic seat (11) that includes a rollover valve (21) mounted in the air inlet line of the pneumatic seat is disclosed. The valve (21) releases air from the pneumatic seat (11) when the valve is tilted or overturned, which occurs when the vehicle is tilted or overturned. The valve includes a spring-loaded poppet (43) that encloses an exhaust port (41). Attached to the poppet is a downwardly extending whisker (65) that extends into an inverted conical cup (64). A conically shaped element (78) is affixed to the lower end of the whisker (65). Housed in the inverted conical cup is a relatively heavy ball (67). When the valve (21) is tilted or overturned, the ball (67) hits the side of the conically shaped element (78) causing the whisker (65) to tilt and the spring-loaded poppet (43) to open the exhaust port. Opening the exhaust port (41) releases air from the air bag (15).

32 Claims, 4 Drawing Sheets

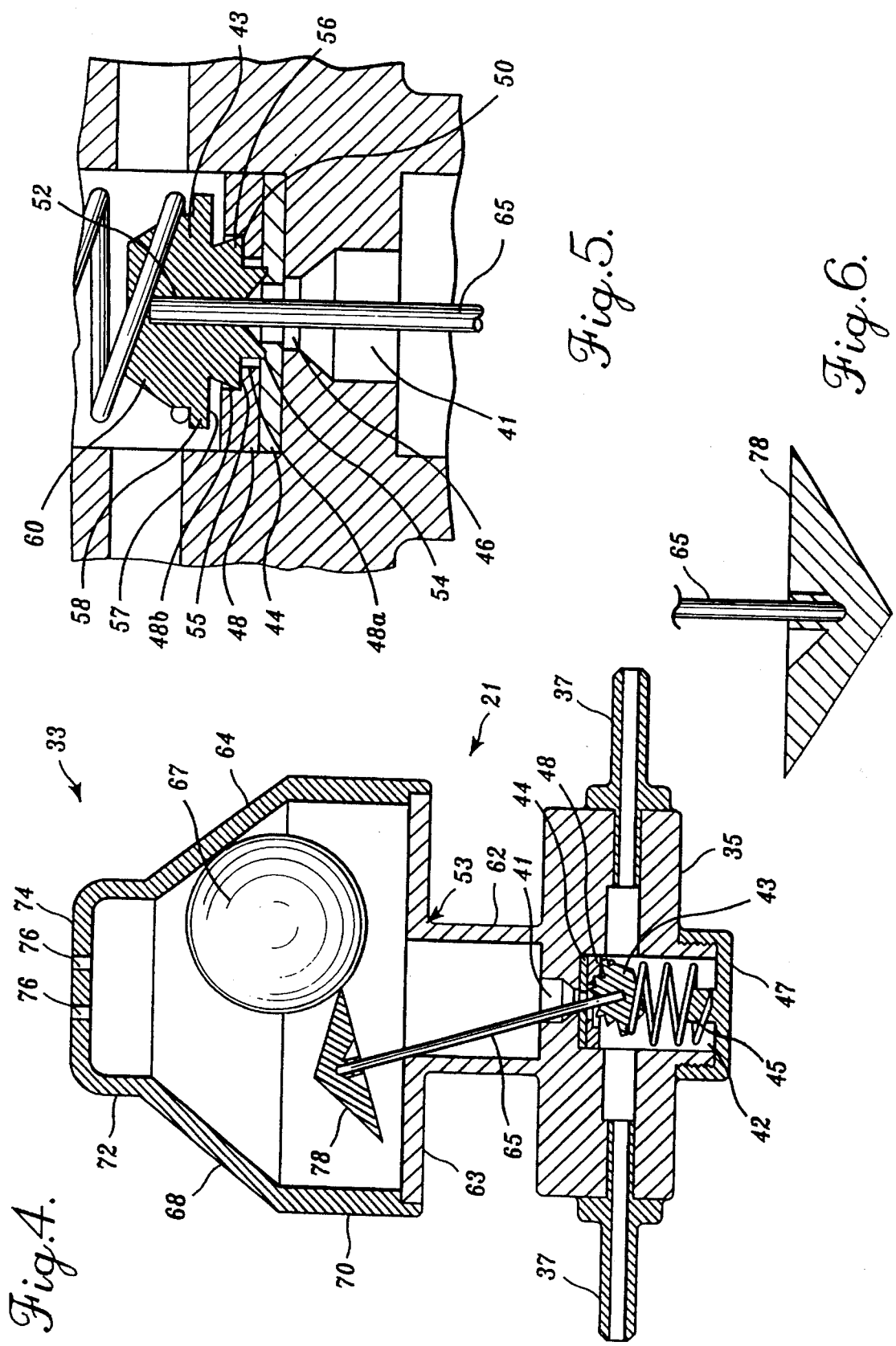

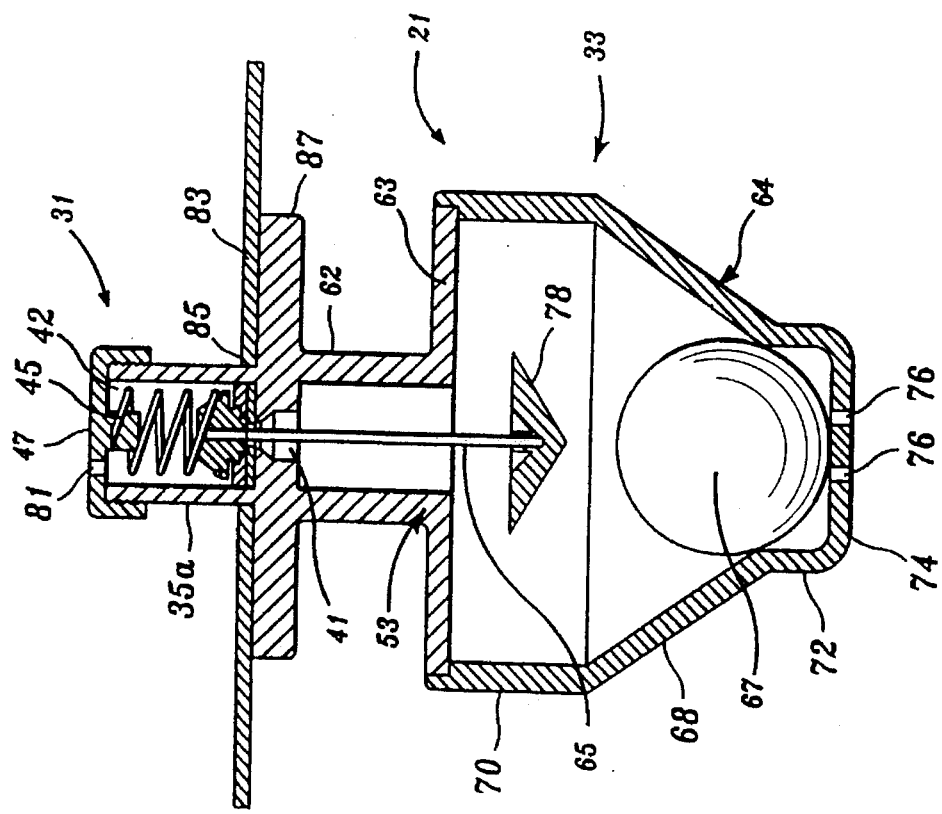
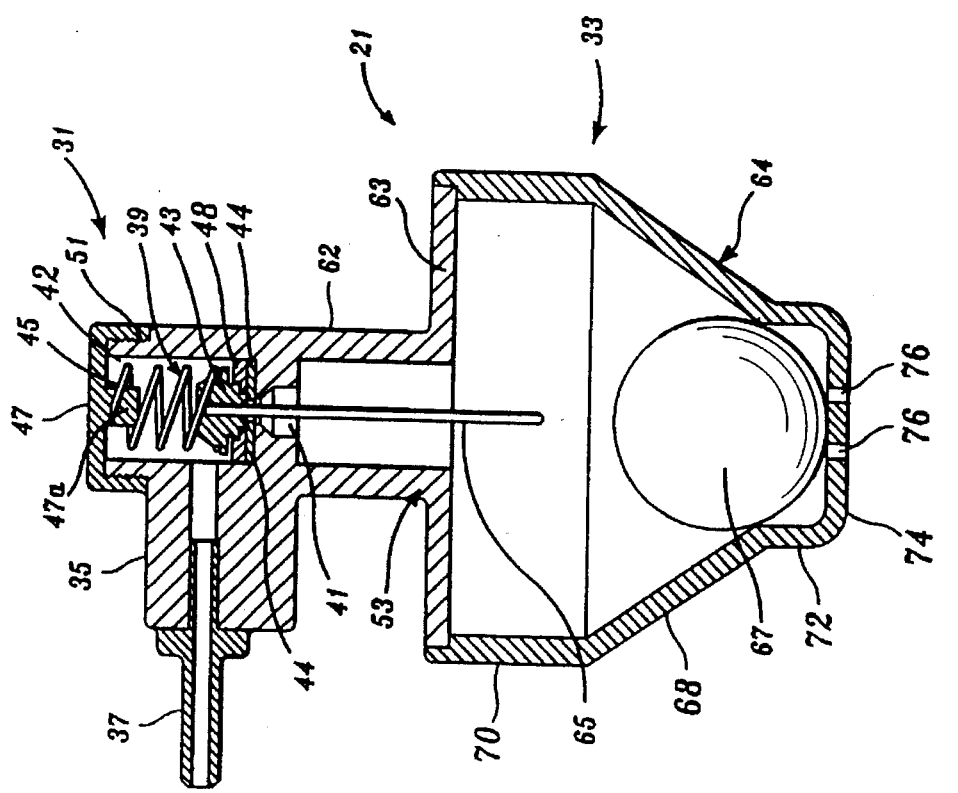

PNEUMATIC SEAT ROLLOVER VENT VALVE

TECHNICAL AREA

The present invention is directed to pneumatic seats and, more particularly, to mechanisms for releasing or venting air from the air bags of pneumatic seats.

BACKGROUND OF THE INVENTION

In recent years pneumatic seats for use in vehicles have been developed. Pneumatic seats comprise a pedestal that includes one or more air bags, a seat supported by the pedestal and a control valve for controlling the pressure of the air in the air bag(s). Pneumatic seats are particularly desirable in vehicles that are driven for extended periods of time, such as long-haul trucks. Because the air in the bag controls the height of the driver's seat, pneumatic seats can be used to adjust the seat to the size and desires of the driver. Further, truck drivers are constantly subjected to vibration and bouncing, which can lead to medical injuries, such as lumbar pain. The air bag pedestal functions as a shock absorber that absorbs the vibration and bouncing that would be transferred to the seat in the absence of the air bags.

One disadvantage of pneumatic seats has been detected. In an accident that results in a vehicle with pneumatic seats tilting severely or rolling over, it is sometimes difficult to extract occupants from the vehicle because inflated pneumatic seats can pin an occupant against the roof or other areas of the vehicle. While the control valve that is used to control the air in the air bags of pneumatic seats can be used to vent air from pneumatic seats, rescue personnel are often not familiar with pneumatic seat control systems. This has led to a need for a device that automatically releases or vents air from a pneumatic seat in the event the vehicle in which the pneumatic seat is located is severely tilted or rolls over. The invention is directed to fulfilling this need.

SUMMARY OF THE INVENTION

In accordance with this invention, a mechanism for venting air from the air bag(s) of pneumatic seats mounted in a vehicle if the vehicle is tilted or overturned is provided. The mechanism includes a rollover vent valve mounted in the vehicle that is coupled to the air bag(s) of the pneumatic seat. The rollover vent valve is designed and mounted such that an exhaust port is closed as long as the vehicle remains substantially upright. If the vehicle tilts substantially or is overturned, the exhaust port is opened, allowing air to escape from the air bag(s).

In accordance with other aspects of this invention, the rollover vent valve includes a spring-loaded poppet that closes the exhaust port. Extending outwardly from the poppet, through the exhaust port, is a whisker that functions as an actuating arm. The rollover vent valve also includes an actuating mechanism that operatively co-acts with the whisker such that a force is applied to the whisker that causes the poppet to rotate away from the exhaust port, against the force of the spring, when the valve is tilted or overturned.

In accordance with the other aspects of this invention, the actuating mechanism comprises a conically-shaped cup and a heavy ball housed in the cup. The whisker extends into the cup, so as to lie above the ball, when the cup is in its normal, upright position. When the valve is tilted through some predetermined angle, such as 80°, or inverted, the ball impinges on one side of the outer end of the whisker, creating the force that rotates the poppet away from the exhaust port.

In accordance with further aspects of this invention, preferably, the rollover vent valve is mounted in the air line extending between the control valve that controls the pressure of air in the air bag(s), and the air bag(s). Alternatively, the rollover vent valve may be connected to the air bag(s) via a separate conduit, or integrated into the air bag(s) or the control valve.

As will be readily appreciated from the foregoing summary, the invention provides an uncomplicated, reliable mechanism for automatically venting or releasing air from the air bags that support pneumatic seats when the vehicle in which the seats are mounted is severely tilted or overturned. Because air is automatically vented from the air bags, it is easier for rescue personnel to remove injured occupants from vehicles that have been severely tilted or overturned during an accident. In essence, when a vehicle containing an embodiment of the invention is tilted or overturned, the rollover vent valve is tilted or overturned. When the rollover vent valve is tilted or overturned, the valve opens and releases air from the air bags of pneumatic seats mounted in the vehicle.

BRIEF DESCRIPTION OF THE DRAWINGS

The foregoing features and advantages of the invention will become more readily appreciated as the same becomes better understood by reference to the following detailed description, when taken in conjunction with the accompanying drawings, wherein:

FIG. 4 is a cross-sectional view of the rollover vent valve illustrated in FIGS. 2 and 3, in an inverted position;

FIG. 5 is an enlarged fragmentary view of a portion of the embodiment of the invention as shown in FIGS. 2–4;

FIG. 6 is an enlarged fragmentary view of another portion of the embodiment of the invention shown in FIGS. 2–4;

FIG. 7 is a cross-sectional view of an alternative embodiment of a rollover vent valve formed in accordance with the invention; and FIG. 8 is a cross-sectional view of another alternative embodiment of a rollover vent valve formed in accordance with the invention.

DETAILED DESCRIPTION OF THE PREFERRED EMBODIMENTS

Figure 1:
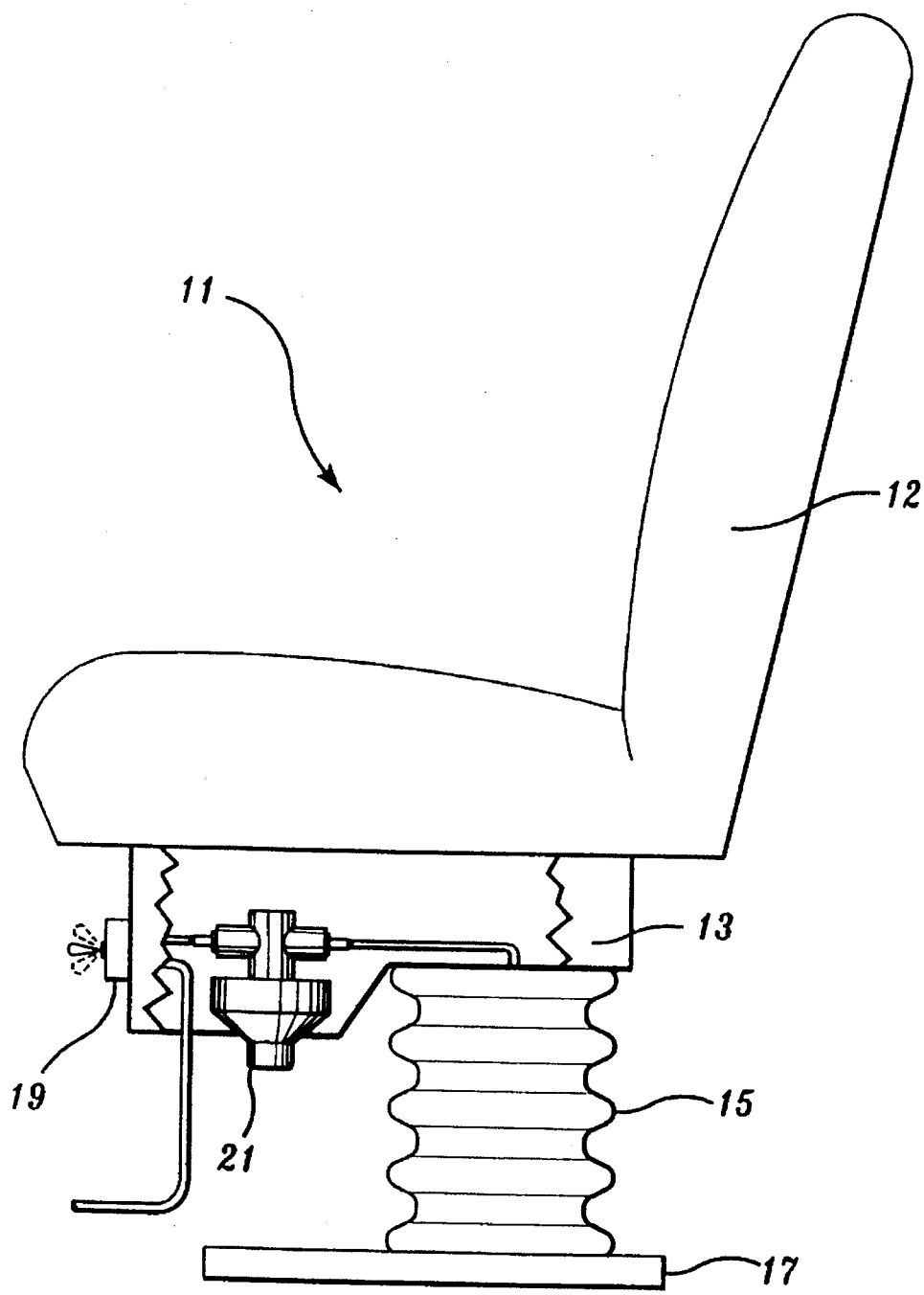
FIG. 1 is a pictorial diagram of a pneumatic seat that includes a rollover vent valve formed in accordance with the invention.

FIG. 1 is a pictorial diagram illustrating a rollover vent valve 21 formed in accordance with the invention mounted in the air pressure line of a pneumatic seat 11. The pneumatic seat 11 is of the type commonly used in long-haul vehicles, such as trucks. Such pneumatic seats include a seat 12 supported by a frame 13. The frame 13 is positioned atop a pedestal formed by one or more air bags 15. The air bags in turn are mounted on a seat base 17 that is affixed to the floor of the cab of a truck. A pneumatic source (not shown) supplies compressed air to the air bags 15 via a control valve 19. The control valve manually controls the amount of air in the air bags 15 by either connecting the source of compressed air to the air bags 15 or connecting the air bags 15 to an exhaust outlet (not shown). The air controls the height of the seat 11.

The invention improves on pneumatic seats of the type shown in FIG. 1 by adding a rollover vent valve 21 that releases air from the air bag(s) 15 in the event the vehicle within which the pneumatic seat is located overturns or is severely tilted (preferably by 80° or more). The rollover vent valve 21 is connected between the control valve 19 and the air bag 15. The rollover vent valve is designed to connect the air bag 15 to the atmosphere in the event the vehicle in which the pneumatic seat is located is severely tilted or rolls over.

While FIG. 1 illustrates the presently preferred location for the rollover vent valve 21, i.e., in the line between the control valve 19 and the air bag(s) 15, as will be better understood from the following description, the rollover vent valve can be connected to the air bag(s) in other manners. For example, it can be connected to the air bag(s) 15 via a separate conduit, as shown in FIG. 7 and described below, or integrated into the air bag(s) 15, as shown in FIG. 8 and described below.

Figure 2:
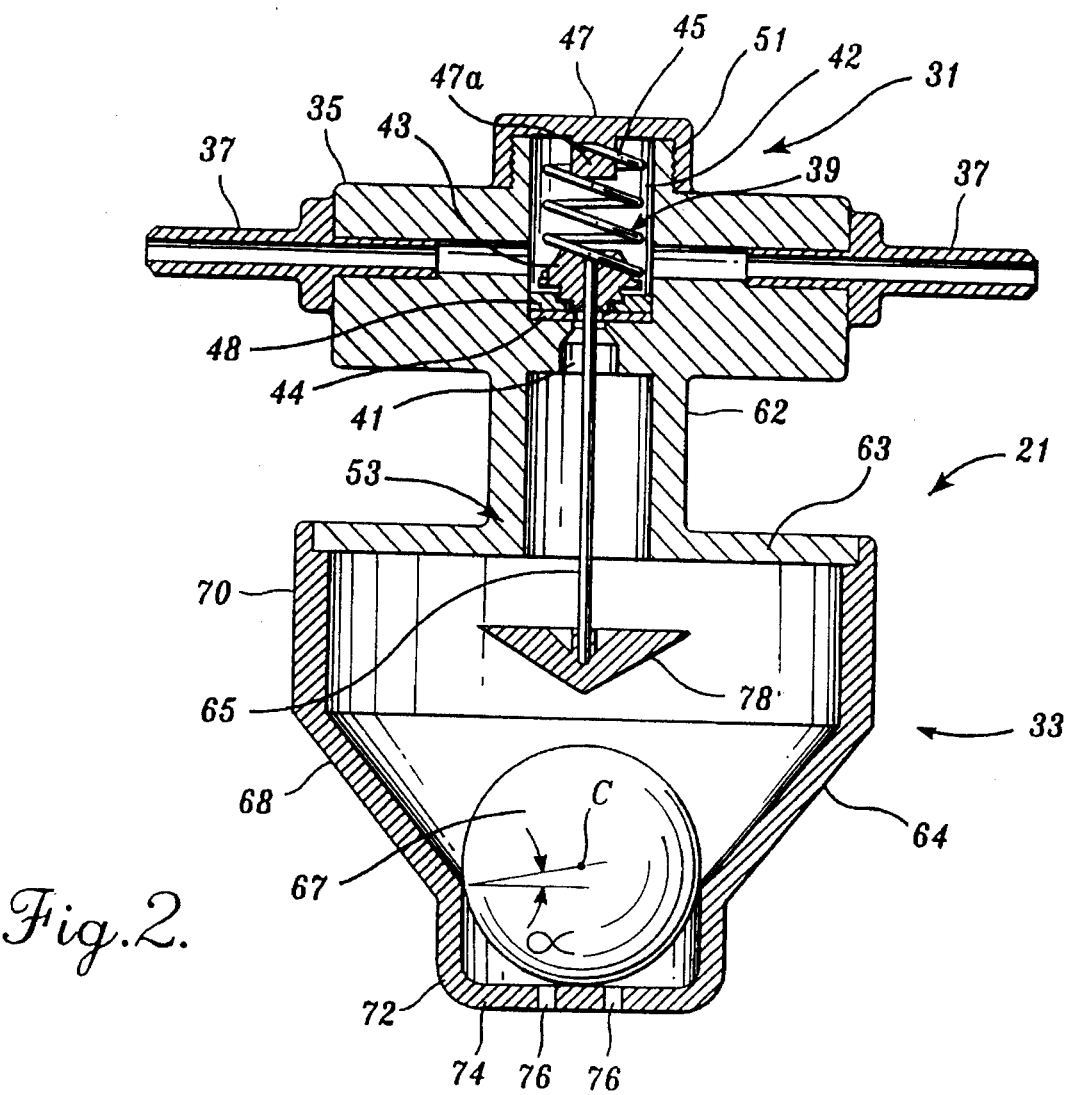
FIG. 2 is a cross-sectional view of a preferred embodiment of a rollover vent valve formed in accordance with the invention taken along line 2—2 of FIG. 3.
Figure 3:
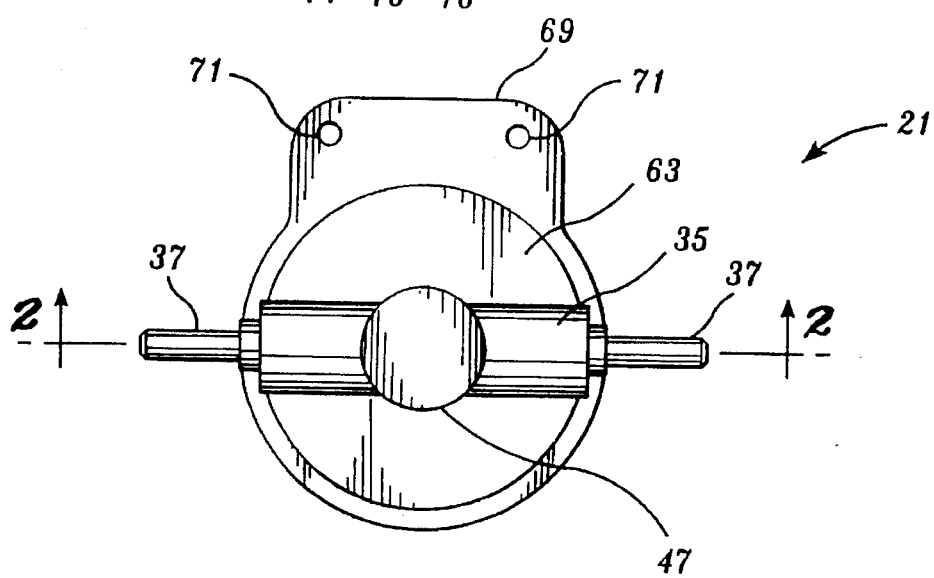
FIG. 3 is a top view of the rollover vent valve illustrated in FIG. 2.

FIGS. 2–4 illustrate the presently preferred embodiment of a rollover vent valve 21 suitable for use in releasing air from the air bags of a pneumatic seat in the event of a vehicle tilt or rollover. FIG. 2 illustrates the valve in the upright or normal position and FIG. 4 illustrates the valve in the rolled-over or inverted position. In the upright position the valve is closed and air passes uninterrupted between the control valve 19 and the air bag 15. In the inverted position the air line between the control valve 19 and the air bag 15 is connected to the atmosphere.

The rollover vent valve 21 illustrated in FIGS. 2–4 includes a valve section 31 and an actuating section 33. The valve section 31 includes an elongate valve housing 35 that may have a tubular shape. Mounted in both ends of the valve housing 35 are bayonet-type hose connectors 37. Located in the valve housing 35, between the bayonet-type hose connectors 37, is a valve assembly 39 that includes an exhaust port 41 formed in the wall of the housing 35, a poppet 43, a coil spring 45, and a cap 47.

The poppet 43 is located on the inward side of the exhaust port 41. More specifically, the housing 35 includes a chamber in the form of a transverse bore 42 whose diameter is greater than the diameter of the inner end 46 of the exhaust port 41. As best shown in FIG. 5, a layer of elastomeric material 44 surrounds the inner end 46 of the exhaust port 41. The elastomeric layer 44 is sandwiched between the wall of the housing 35 and a washer-shaped collar 48 formed of a rigid material. The hole in the washer-shaped collar 48 includes a step 50 that faces the transverse chamber 42.

The poppet 43 is cylindrically shaped and includes a central hole 52 for receiving one end of a whisker 65 (described below) that extends outwardly from one end of the poppet. The whisker is press fit into the hole 52 in the poppet. The end of the poppet from which the whisker extends includes a conical cavity that creates a conical ridge 54, which surrounds the whisker. The poppet is sized such that the diameter of the conical ridge 54 is smaller than the diameter of the smaller diameter portion 48a of the hole in the washer-shaped collar 48. The height of the conical ridge 54 is slightly greater than the height of the smaller diameter portion 48a of the hole in the washer-shaped collar 48. The conical ridge 54 terminates at an outwardly extending flange 55 whose outer diameter is substantially the same as the diameter of the larger diameter portion 48b of the hole in the washer-shaped collar 48.

After the flange 55, the outer surface of the poppet 43 tapers inwardly. The height of the inward taper is greater than the height of the larger diameter portion 48b of the hole the washer-shaped collar 48. The inward taper and the flange that extends outwardly from the ridge 54 define a cylindrical foot 56 sized to fit in the step 50 in the washer-shaped collar 48. The inward taper ends at another outwardly extending flange 57 whose diameter is greater than the diameter of the larger diameter portion 48b of the hole in the washer-shaped collar and less than the diameter of the transverse bore 42. The flange 57 partially defines a peripheral ridge 58. Extending outwardly from the ridge on the side remote from the foot 56 is a protrusion sized 60 to fit inside of the coil spring 45, which has one end seated on the peripheral ridge 58.

Returning to FIG. 2, the coil spring 45 lies in the transverse bore 42. Thus, the longitudinal axis of the coil spring 45 lies orthogonal to the longitudinal axis of the valve housing 35. The other end of the coil spring 45 impinges on the cap 47, which is secured to a boss 51 that protrudes outwardly from the side of the valve housing 35 remote from the exhaust port 41. The cap 47 may be screwed to the boss 51 as shown or otherwise attached, using adhesive, for example. Also, preferably, a protrusion 47a extends inwardly from the cap, inside the coil spring 45. The protrusion provides a stop for poppet motion and helps maintain the lateral position of the coil spring as air moves through the valve and as the valve is opened and closed in the manner hereinafter described.

The actuating section 33 includes a housing 53 that extends outwardly and, preferably, is formed integral with the valve housing 35. The actuator housing 53 includes a small cylindrical section 62, an outwardly extending flange 63 and a cup 64. The small cylindrical section 62 is formed integral with the valve housing 35. The flange 63 is integrally formed with and extends outwardly from the outer end of the smaller cylindrical section 62.

The outer edge of the flange 63 is affixed to and encloses the open end of the cup 64 which has a generally conical shape. More specifically, the cup 64 has the general shape of an inverted, truncated cone with integral cylindrical portions extending outwardly from both ends of a cone portion 68. The outer end of the larger cylindrical portion 70 is affixed to the periphery of the flange 63 in any suitable way, such as by an adhesive. The outer end of the smaller cylindrical portion 72 is enclosed by a planar portion 74 that includes one or more holes 76.

The actuating section 33 further includes the whisker 65 and a ball 67. The whisker is formed of suitably resilient material, such as steel, and the ball is formed of a relatively heavy material, such as lead or steel. The diameter of the ball 67 is slightly less than the inside diameter of the smaller cylindrical portion 72 of the cup 64. The whisker extends through the housing 53 and into the cup 64. The ball 67 is located at the bottom, i.e., in the smaller cylindrical portion 72 of the cup 64 when the rollover vent valve 21 is in the upright position illustrated in FIG. 2. Preferably, as shown in FIG. 2, the diameter of the ball 67 is greater than the height of the smaller cylindrical portion 72 of the cup 64. The angle drawn between the upper edge of the smaller cylindrical portion 72 and the center (C) of the ball 67 as shown in FIG. 2 is approximately ten degrees (10°).

When the rollover vent valve 21 is in the upright position, the coil spring 45 presses the valve poppet 43 against the washer-shaped collar 48 and embeds the conical ridge 54 of the poppet 43 in the layer of elastomeric material 44. That is, since the height of the conical ridge 54 is greater than the height of the smaller diameter portion of the washer-shaped collar, the outer edge of the conical ridge is slightly imbedded into the layer of elastomeric material 44, thereby sealing the exhaust port 41. Affixed to the outer end of the whisker 65 is a conically-shaped element 78 whose tip points away from the whisker and, thus, toward the ball 67.

The rollover vent valve 21 also includes an attachment plate 69. See FIG. 3. The attachment plate 69 is integral with the cup 64 of the actuating section 33. The attachment plate 69 extends outwardly and includes one or more holes 71 for use in attaching the rollover vent valve 21 to a vehicle support such that the valve is in the upright position illustrated in FIGS. 1 and 2 when the vehicle is upright. When in this position, as noted above, the coil spring 45 presses the conical ridge 54 of the poppet 43 into the layer of elastomeric material 44 and seals the exhaust port 41. Thus, in this position, the rollover vent valve 21 is closed. As a result, air passes between the bayonet connectors 37 located at the ends of the valve housing 35.

FIG. 4 illustrates how the rollover vent valve 21 is opened when the vehicle in which the valve is located is severely tilted or inverted. When the rollover vent valve is inverted or severely tilted (beyond 80° from upright), the ball 67 leaves the smaller cylindrical portion 72 of the cup 64 and rolls toward the other end. When this occurs, the ball 67 presses against the conically-shaped element 78 affixed to the end of the whisker 65, creating a force that tilts the whisker. In this regard, it should be noted that the distance between the conically-shaped element 78 and the surrounding wall of the cup 64 is smaller than the diameter of the ball 67. Preferably, the angle of the conically-shaped element 78 and the wall of the cone portion 68 of the cup 64 converge in the upward direction when the rollover vent valve is upright. As a result, when the rollover vent valve 21 is inverted, the ball 67 pushes the whisker laterally, away from its normal position. Since the whisker 65 is affixed to the valve poppet 43, the valve poppet tilts. The point of tilting is located where the tip of the cylindrical foot 56 intersects the corner of the step 50 on the same side of the whisker that receives the force created by the ball. As shown in FIG. 4, tilting of the valve poppet 43 results in the valve poppet moving away from the layer of elastomeric material 44. This creates a passageway between the interior of the valve housing 35 and the exhaust port 41. The passageway allows air to leave the rollover vent valve via the exhaust port 41 and the holes 76 in the cup 64, resulting in air leaving the air bag(s) 15 to which the valve is connected.

In essence, when the rollover vent valve 21 is tilted or overturned, the ball 67 wedges against the conically-shaped element 78 affixed to the end of the whisker 65. The whisker functions as an actuating arm, causing the valve poppet to open and vent the device to which the valve is connected. Tilt can occur around any axis. The leverage force created by the wedging action of the ball 67 is amplified by the length of the whisker 65. The conically-shaped element assists in directing the ball to the side of the whisker when the rollover vent valve is inverted and increases the lateral movement of the whisker as the ball wedges between the conical angle of the conically-shaped element 78 and the conical angle of the cone portion 68 of the cup 64.

FIGS. 7 and 8 illustrate alternative embodiments of the invention. The only differences between the embodiment of the invention illustrated in FIG. 7 and the embodiment of the invention illustrated in FIGS. 2–4 is the elimination of the conically-shaped element 78 located at the outer end of the actuator arm or whisker 65 and the elimination of one of the bayonet-type hose connectors 37. While the inclusion of a conically-shaped element 78 is presently preferred, the invention will operate without this element, provided a whisker with suitable rigidity and a suitably sized ball are chosen. The elimination of one of the bayonet-type hose connectors 37 creates a version of the invention designed to be separately connected to an air bag 15, rather than coupled in the air inlet line as shown in FIG. 1.

The rollover vent valve shown in FIG. 8 is designed for inclusion directly in an air bag 15. As a result, both bayonet-type hose connectors, as well as the related portion of the valve housing 35, are eliminated. While the coil spring remains caged in a housing 35a that includes a cavity 42, the air entry into the cavity is via a hole 81 located in the cup 47, rather than via holes that terminate at hose connectors. The rollover vent valve shown in FIG. 8 is mounted in the wall 83 of an air bag 15, such that only the part of the housing 35a that cages the coil spring 45 extends into the air bag via a hole 85. A flange 87 located between the part of the housing inserted into the air bag and the housing 53 of the actuating section is attached to the wall 83 by a suitable adhesive, for example, and surrounds the hole 85 in the wall 83. The housing 53 of the actuating section 33 extends outwardly, oriented such that the ball 67 lies in the smaller cylindrical portion 72 of the cup 64 when the rollover vent valve is upright.

As will be readily appreciated from the foregoing description, the invention provides a pressure release mechanism in the form of a rollover vent valve suitable for releasing the air from the air bag or bags of the pneumatic seats of a vehicle in the event the vehicle in which the pressure release mechanism is mounted is severely tilted or overturns. As a result, the potential for pneumatic seats to "pin" an injured occupant in an overturned or severely tilted vehicle is eliminated.

While the preferred embodiment of the invention is designed for use in the line extending from the control valve to the air bag(s) of pneumatic seats, as noted above, the valve can be separately connected to the air bag(s) or built into the air bag(s). Or, the valve can be built into the control valve. The number of rollover vent valves required will, of course, depend on the specific pneumatic seat assembly with which the invention is being used. If only a single air bag is included, only a single rollover vent valve will be required. If the air pressure in several air bags is controlled by a single control valve, again, only a single rollover vent valve is required. In contrast, if separate control valves are included for each air bag, a rollover vent valve for each air bag will normally be required. Hence, it is to be understood that various changes can be made in the disclosed embodiment of the invention without departing from the spirit and scope of the invention as defined by the appended claims.

The embodiments of the invention in which an exclusive property or privilege is claimed are defined as follows:

1. In a pneumatic seat mounted in a vehicle, said pneumatic seat including at least one air bag and a control valve for controlling the quantity of the air in said air bag, the improvement comprising a rollover vent valve coupled to said air bag for venting air from said air bag in the event the vehicle in which said pneumatic seat is mounted is severely tilted or overturned.

2. The improvement claimed in claim 1, wherein said rollover vent valve includes a chamber coupled to said air bag, an exhaust port formed in a wall of said chamber, and a closure for normally closing said exhaust port.

3. The improvement claimed in claim 2, wherein said rollover vent valve includes a force-producing mechanism coupled to said closure for applying a force to said closure that causes said closure to move away from and open said exhaust port when the vehicle in which said rollover vent valve is mounted is severely tilted or inverted.

4. The improvement claimed in claim 3, wherein said closure is a poppet.

5. The improvement claimed in claim 4 including a layer of elastomeric material surrounding said exhaust port and located between said poppet and the wall of said chamber that surrounds said exhaust port.

6. The improvement claimed in claim 5, wherein said poppet includes a ridge that faces and is partially embedded into said layer of elastomeric material when said poppet closes said exhaust port.

7. The improvement claimed in any one of claims 4–6, wherein said force-producing mechanism includes a whisker affixed to and extending outwardly from said poppet and a ball that applies a force to the remote end of said whisker when said vehicle in which said rollover valve is mounted is severely tilted or inverted.

8. The improvement claimed in claim 7, wherein said rollover vent valve includes a cup-shaped receptacle sized and positioned such that said whisker extends into said cup-shaped receptacle and said ball is positioned in the bottom of said cup-shaped receptacle when the vehicle in which said rollover vent valve is mounted is in an upright position.

9. The improvement claimed in claim 8, wherein said cup-shaped receptacle has the general shape of an inverted, truncated cone.

10. The improvement claimed in claim 9, wherein said cup-shaped receptacle includes a conical portion and an integral cylindrical portion extending outwardly from the smaller end of said conical portion.

11. The improvement claimed in claim 10, wherein said internal diameter of said integral cylindrical portion of said cup-shaped receptacle is slightly greater than the diameter of said ball.

12. The improvement claimed in claim 11 including a washer-shaped collar located between said layer of elastomeric material and said poppet, the hole in said washer-shaped collar including a step and wherein said poppet includes a foot that lies in the step of said washer-shaped collar.

13. The improvement claimed in claim 12, wherein rollover vent valve is located between said control valve and said air bag.

14. The improvement claimed in claim 13, wherein said rollover vent valve includes a housing, said housing defining said chamber and including main ports located on opposite ends of said housing, said exhaust port located in the wall of said housing, between said main ports.

15. The improvement claimed in claim 12, wherein said rollover vent valve includes a spring for pressing said poppet against the wall of said chamber that surrounds said exhaust port.

16. The improvement claimed in claim 15, wherein said spring is a coil spring mounted such that the longitudinal axis of said coil spring is co-axial with the longitudinal axis of said exhaust port.

17. The improvement claimed in claim 16, wherein said rollover vent valve is located between said control valve and said air bag.

18. The improvement claimed in claim 17, wherein said rollover vent valve includes a housing, said housing defining said chamber and including main ports located on opposite ends of said housing, said exhaust port located in the wall of said housing, between said main ports.

19. A rollover vent valve for releasing air from the air bags of a pneumatic seat, said rollover vent valve comprising:
 a valve section, said valve section including an exhaust port and a closure for closing said exhaust port when said rollover vent valve is in an upright position; and
 an actuating section, said actuating section including a force-producing mechanism coupled to said closure for applying a force to said closure that causes said closure to move away from and open said exhaust port when said rollover vent valve is severely tilted or inverted, said force-producing mechanism including a whisker affixed to and extending outwardly from said closure and a ball for applying force to the remote end of said whisker, said actuating section also including a housing that includes a cup-shaped receptacle aligned with said whisker such that said whisker extends into said cup-shaped receptacle, said whisker and said ball positioned and sized such that said ball lies in said receptacle and does not apply force to the remote end of said whisker when said rollover vent valve is in an upright position.

20. The rollover vent valve claimed in claim 19, wherein: (i) said valve section includes a chamber; (ii) said exhaust port is formed in a wall of said chamber; and (iii) said closure is a poppet.

21. The rollover vent valve claimed in claim 20, including a layer of elastomeric material surrounding said exhaust port and located between said poppet and the wall of said chamber that surrounds said exhaust port.

22. The rollover vent valve claimed in claim 21, wherein said poppet includes a ridge that faces and is partially embedded in said layer of elastomeric material when said poppet closes said exhaust port.

23. The rollover vent valve claimed in claim 22, wherein said cup-shaped receptacle has the shape of an inverted, truncated cone.

24. The rollover vent valve claimed in claim 23, wherein said valve section also includes a spring for pressing said poppet against the interior surface of the wall of said chamber that surrounds said exhaust port.

25. The rollover vent valve claimed in claim 24, wherein said spring is a coil spring mounted such that the longitudinal axis of said coil spring is co-axial with the longitudinal axis of said exhaust port.

26. The rollover vent valve claimed in claim 25, wherein said valve section includes a housing having two main ports, said housing including said chamber and said exhaust port.

27. The rollover vent valve claimed in claim 26, wherein said main ports are located on opposite ends of said housing, and said exhaust port is located in the wall of said housing between said main ports.

28. The rollover vent valve claimed in claim 19, wherein said cup-shaped receptacle has the shape of an inverted, truncated cone.

29. The rollover vent valve claimed in claim 28, wherein said valve section also includes a spring for pressing said closure against said exhaust port.

30. The rollover vent valve claimed in claim 29, wherein said spring is a coil spring mounted such that the longitudinal axis of said coil spring is co-axial with the longitudinal axis of said exhaust port.

31. The rollover vent valve claimed in claim 30, wherein said valve section includes a housing having two main ports, said valve section housing including said exhaust port.

32. The rollover vent valve claimed in claim 31, wherein said main ports are located on opposite ends of said housing, and said exhaust port is located in the wall of said housing between said main ports.

* * * * *